United States Patent [19]

Spencer

[11] Patent Number: 5,288,168
[45] Date of Patent: Feb. 22, 1994

[54] METHOD AND APPARATUS FOR LINING OUTDOOR FLUID CONTAINMENT AREAS TO FACILITATE ELECTRICAL LEAK DETECTION

[75] Inventor: John L. Spencer, Conroe, Tex.

[73] Assignee: Gundle Lining Construction Corporation, Houston, Tex.

[21] Appl. No.: 934,868

[22] Filed: Aug. 24, 1992

[51] Int. Cl.$^5$ .............................................. B65G 5/00
[52] U.S. Cl. ...................................... 405/54; 324/559;
340/605; 428/328; 405/129
[58] Field of Search .................. 324/512, 557, 559;
340/605; 428/323, 328, 329; 405/53, 54, 55, 128, 129

[56] References Cited

U.S. PATENT DOCUMENTS

| | | | |
|---|---|---|---|
| 3,252,155 | 5/1966 | Surtees et al. | 340/242 |
| 3,973,063 | 8/1976 | Clayton . | |
| 4,110,739 | 8/1978 | Kidd | 340/605 |
| 4,265,789 | 5/1981 | Christopherson et al. | 252/511 |
| 4,397,703 | 8/1983 | Osborn | 156/177 |
| 4,404,516 | 9/1983 | Johnson, Jr. | 324/54 |
| 4,540,624 | 9/1985 | Cannady | 428/282 |
| 4,543,525 | 9/1985 | Boryta et al. | 324/559 |
| 4,613,922 | 9/1986 | Bachmann | 361/215 |
| 4,725,785 | 2/1988 | Converse et al. | 324/559 |
| 4,766,420 | 8/1988 | Hastings et al. | 340/550 |
| 4,771,246 | 9/1988 | Boryta et al. | 324/559 |
| 4,876,140 | 10/1989 | Quackenbush | 428/216 |
| 4,914,395 | 4/1990 | Hamada | 324/557 |
| 4,981,762 | 1/1991 | Athey, jr. | 428/594 |

FOREIGN PATENT DOCUMENTS 8703987 7/1987 World Int. Prop. O. .......... 324/559

*Primary Examiner*—Randolph A. Reese
*Assistant Examiner*—John Ricci
*Attorney, Agent, or Firm*—Arnold, White & Durkee

[57] ABSTRACT

An improved method and apparatus for waterproofing soil utilizing a flexible plastic sheet for providing a water barrier provides a system for readily detecting the presence of holes in the plastic material. The sheet includes a plastic layer which may be rendered electrically conductive by embedding conductive particles within it. The integrity of the sheet may then be monitored by establishing an electric field across the sheet and monitoring for sparks between the conductive plastic layer and a probe. Reliable and economical testing is possible, even in situation where electrical leak testing was not previously feasible.

38 Claims, 3 Drawing Sheets

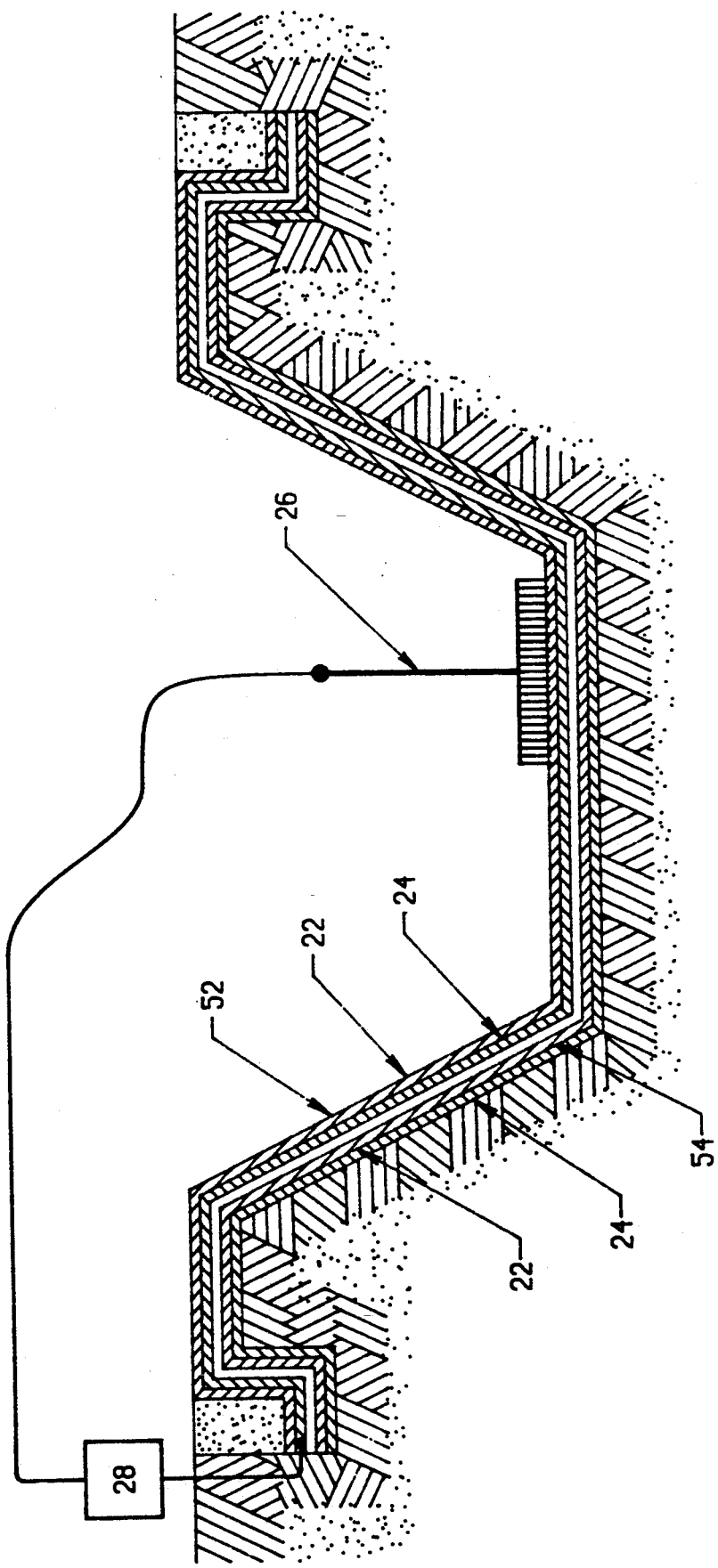

METHOD AND APPARATUS FOR LINING OUTDOOR FLUID CONTAINMENT AREAS TO FACILITATE ELECTRICAL LEAK DETECTION

FIELD OF THE INVENTION

This invention relates to an improved method and apparatus for lining outdoor fluid containment areas such as reservoirs, hazardous waste disposal sites, and other similar applications. Specifically, the present invention relates to a moisture impervious thermoplastic sheet or liner particularly suitable for environmental pollution control as a liquid barrier. The present invention relates to a particular type of liner adapted to facilitate in situ leak testing.

BACKGROUND OF THE INVENTION

The purpose of using a lining system is to provide a "impermeable" barrier between contaminants and ground water. Generally, these liners are made of insulating material such as high density polyethylene. For example, Gundle Lining Systems, Inc. of Houston, Tex. has a high density polyethylene liner available in thicknesses of 1 millimeter to 3.5 millimeters.

Synthetic liners, manufactured under stringent quality control standards, are thoroughly tested to be defect free at the time of shipment. However, during installation the liner is exposed to a wide spectrum of hazards such as heavy equipment, cutting tools, welding equipment, animals, and vandalism. Even the most stringent quality control program cannot protect against every hazard. Therefore, a final leak check may be conducted after the liner is installed to locate leaks caused by construction damage. These leak tests are designed not only to determine whether or not a leak exists, that is, to detect the leak, but they also hopefully will succeed in locating the leak so that it may be repaired.

Conventional leak detection and location techniques include smoke, traceable gas, electric surveys, and the like. However, in the case of smoke and traceable gas, since there can be no positive assurance that the indicating media has reached the entire surface under the liner, holes that may cause leaks may go undetected.

Electrical surveys require the liner to be in contact with an electrically conductive media both above and below the liner. This normally means that not only must the liner contain a liquid but also the soil upon which the liner rests must be conductive. The resulting water pressure on top of the liner generally maintains the liner in contact with the subgrade. However, contact with the earth is not always maintained because of irregularities in the subgrade and wrinkles in the liner.

Primary liners in a double liner system cannot be tested in this way because the space between the liners would have to be flooded in order to have electrically conductive media on both sides of the primary liner, and this would cause the primary liner to float. Similarly, side slopes are normally not tested due to the extreme difficulty of maintaining a water volume sufficient to cover the sides as well as the bottom of the liner, and because the resulting depth of the water makes testing difficult.

In known systems, the entire liner surface must be surveyed to detect and locate all defects. After the defects are discovered, since the leaks cannot be repaired under water, it is necessary to drain the liquid from the cover, make repairs, refill and survey again to ensure that all defects have been located and repaired. This process is time consuming and expensive particularly with large lined areas.

In a commercially available apparatus for electrically detecting liner leaks, a potential is induced across the thickness of a liner. If a potential of one polarity is induced on one side of the sheet and a potential of the opposite polarity is induced on the opposite side of the sheet, the resulting electrical field will be affected if there is any conductivity from side to side across the sheet. The effects of the conduction can be sensed to detect the presence of a leak.

Existing system can detect leaks through pin holes as small as 1.0 millimeter in diameter. Even such small holes may cause leaks on the order of a couple of gallons per day with one foot of water pressure. Thus, the presence of even small holes in such liners is of considerable significance. One author has recently indicated that on average there are about 26 holes per ten thousand square meters of liner. Peggs, "Detection and Investigation of Leaks in Geomembrane Liners," Geosynthetics World, Winter 1990. Particularly where hazardous materials are involved, it is extremely important that these holes be located and repaired prior to placing the impoundment in service.

The accuracy of existing methods is limited by the fact that both sides of the liner must be in contact with a conductive medium. In the case of a double liner, the upper or primary liner is not in contact with a conductive medium on both sides. With respect to the lower or secondary liner or in a situation where there is only one liner, a problem arises because a liner may not be in good electrical contact with the earth. Moreover, where the earth is dry or not conductive, the system may not be reliable.

It has been suggested that the liner could be placed in contact with a conductive foil sheet. In U.S. Pat. No. 3,252,155 to Surtees et al., a liner is placed over or even adhesively secured to a metal foil sheet. While that system would appear to overcome some of the problems in the prior art, this technique has not achieved acceptance in the industry. It is likely that any type of exposed metal foil would be severely degraded at the construction site. Moreover, adhesively or mechanically securing the metal foil to the linear would be extremely difficult to achieve, particularly in situ. Even if the foil could be effectively attached, it would be expensive and would raise the possibility of galvanic corrosion.

Thus, a need continues to exist for a liner which may be more easily and economically inspected using an electrical inspection apparatus without the necessity of a liquid medium within the reservoir and without the need for maintaining good electrical contact with conductive natural surroundings outside the liner.

In accordance with the present invention, a method and apparatus is provided to facilitate the detection of holes in liners. In accordance with one aspect of the present invention, a method and apparatus is provided to facilitate to the detection of holes in the plastic sheeting itself.

SUMMARY OF THE INVENTION

These and other important advantages of the present invention may be achieved by a thermoplastic liner for an outdoor fluid containment area that has an upper plastic layer and a lower plastic layer on the containment area. The lower plastic layer is adapted to sufficiently conduct electricity to enable the detection of pin hole leaks in the liner. The thermoplastic liner may be formed by co-extruding two layers of plastic material together. One layer may be conventional plastic used in such applications, while the other layer may have conductive particles dispersed within it. The resulting composite functions as a fully effective liner having connected thereto a conductive region which may act as a plate for allowing electrical testing to detect pin hole leaks.

In accordance with another aspect of the present invention, a method for waterproofing an area of soil includes the step of forming a flexible plastic sheet with a region capable of conducting sufficient electricity to enable pin hole leaks to be reliably located. The soil to be waterproofed is covered with a plurality of flexible sheets. The sheets are then aligned in abutting fashion to create a seam region between adjoining sheets. Then the abutting sheets are permanently joined to provide a continuous and uninterrupted barrier of plastic facing the area form which liquid is to be barred. A potential difference may be created across a sheet to detect the presence of a hole. The sheet may itself be formed by co-extruding a first plastic stream with a second plastic stream having conductive particles dispersed within it.

In accordance with still another aspect of the present invention, a thermoplastic liner for an outdoor fluid containment layer may have upper and lower surfaces such that the lower surface is adapted to lie over the containment area. The liner has a layer containing conductive particles situated proximate to a lower surface and adapted to serve as a conductive region for the detection of liner holes through the use of an electric field.

In accordance with yet another aspect of the present invention, an outdoor fluid containment area thermoplastic liner has upper and lower surfaces such that the lower surface will lie on a fluid containment area. The liner has a conductive region encapsulated within the liner. The conductive region has a volume resistivity of greater than 280 ohm-cm.

In accordance with yet another aspect of the present invention, an outdoor fluid containment area thermoplastic liner includes upper and lower surfaces. The liner has a conductive region that includes material which is capable of conducting electricity proximate the lower surface. The region proximate the upper surface is substantially less conductive of electricity than the region proximate the lower surface.

In accordance with but another aspect of the present invention, a thermoplastic liner for an outdoor fluid containment area has upper and lower surfaces. The liner further includes a conductive region adapted to be conductive of electricity. The conductive region is isolated from the exterior of the liner. The conductive region may be formed of conductive particles dispersed within a thermoplastic material.

In accordance with another aspect of the present invention, a flexible thermoplastic liner for an outdoor containment area has at least two plastic layers. One of the layers is more conductive than the other. The more conductive layer is formed of plastic that is less dense than the plastic forming the less conductive layer.

BRIEF DESCRIPTION OF THE DRAWINGS

FIG. 6 is a sectional view of another embodiment of the present invention.

DETAILED DESCRIPTION OF THE PREFERRED EMBODIMENT

Figure 1:
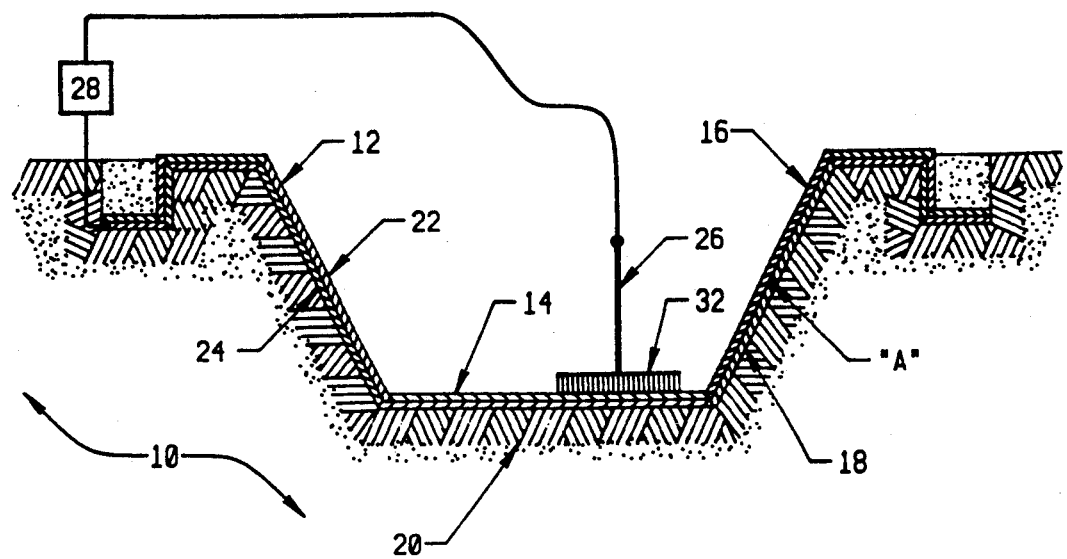
FIG. 1 is a sectional view of a landfill, hazardous waste disposal pond, reservoir or lagoon in accordance with one embodiment of the present invention, wherein the lower layer is exaggerated in thickness for illustration purposes.

Referring to FIG. 1, a hazardous waste site or outdoor fluid containment area 10 may contain a number of water soluble pollutants such as liquid, sludge, solids, or a combination thereof. The outdoor fluid containment area 10 is lined with a water impermeable plastic sheet or thermoplastic liner 12 having a bottom 14 and sidewall 16. The sidewall 16 covers berm area 18 of the containment area 10 and the bottom 14 covers the planar portion 20 of the containment area 10. A liquid (not shown) may be contained by the water impermeable flexible plastic liner 12 constructed in accordance with the present invention.

The thermoplastic liner 12 may be a uniform density material having an upper layer 22 and a lower layer 24 in contact with the containment area 18 and 20. The lower layer 24 is made of a conductive plastic designed to conduct electricity. The lower layer 24 may be integrally bonded to the upper layer 22 of the liner 12. Through the use of the conductive lower layer 24, electrical testing for holes can be easily accomplished using well known equipment.

The thermoplastic liner 12 can be manufactured using standard thermoplastic techniques, such as by co-extrusion. For example, a conductive plastic stream may be co-extruded with a conventional plastic stream to form an integral sheet. With a co-extrusion technique, the conductive plastic seamlessly bonds with the conventional plastic in laminar fashion to form a solid, continuous plastic sheet of a desired thickness containing a lower conductive layer and an upper insulating layer. While a joint "A" is shown in FIG. 1 for illustration purposes, with a co-extrusion technique there may be no such distinct boundary between the layers.

In this way, the upper layer provides the strength and integrity normally required to function as lining for reservoirs and containment areas. At the same time, the lower layer provides a conductive plate to facilitate in situ electrical analysis of the sheet. Because it is not responsible for providing structural integrity, the lower layer may be relatively thin, for example, on the order of 5 mils. In accordance with one preferred embodiment of the present invention, the conductive layer is less than 20% of the thickness of the overall liner and preferably about 5 to 10% of the overall liner thickness.

The conductive layer 24 may be formed in a variety of ways. For example, a doping material may be added to the type of plastic that is normally used to form liners, so that a chemically inert, conductive layer may be formed. In this way, the doping material may be maintained in isolation from the materials associated with the containment area. A variety of particles may be used including powders, flakes, and fibers. For example, the lower layer 24 may be doped with conductive particles such as carbon black, metal particles, or other materials to make the layer sufficiently conductive to allow the detection of leaks regardless of the electrical characteristics of the surrounding material or soil. Advantageously, the conductive particles are nonmetals, and particular advantages may be achieved by using particles that are themselves chemically inert.

While it is generally advantageous to maintain the conductive region in chemical isolation from the environment, it is also advantageous to insure that the conductive region is proximate to the lower surface of the liner. This is because the conductive layer defines the lower boundary of the thickness of the thermoplastic liner to be electrically tested for holes.

In one preferred embodiment, the conductive filler constitutes more than 5% by weight of its layer 24. In another preferred embodiment, the conductive material constitutes between about 10 and about 25% by weight of its layer 24. For example, in an embodiment where the dopant material is carbon black, the carbon black preferably makes up between about 10 and about 15% by weight of its layer 24. One useful carbon black is furnace type carbon black such as Black Pearls 2000 available from Cabot Carbon of Billerica, Mass.. This carbon black has a nitrogen surface area of about 1475 $m^2/gm$.

The doping material, such as carbon black, may be thoroughly intermixed within a plastic stream which is then co-extruded onto the layer 22. Alternatively, a plastic layer containing conductive material may be secured, using any conventional techniques such as adhesive or heat, to another sheet to form the composite. In any case, the conductive layer advantageously has a volume resistivity of less than 280 ohm-cm. A particularly desirable sheet has a volume resistivity of between 10 and 60 ohm-cm. The use of particles with a surface area of greater than 1000 $m^2/cm$ is also advantageous.

Although medium or high density polyethylene or other plastic materials may be used to form the conductive layer 24, it may be desirable to form the conductive layer from low density polyethylene to provide additional elasticity. For example, one useful resin is linear low density polyethylene such as that available from Union Carbide, DGDA-7028, having a density of about 0.85 $gm/cm^3$.

With the present invention, pin hole leaks may be quickly located using the electrical monitoring technique since the more conductive layer quickly and reliably draws electricity through the hole. A spark discharge probe 26 may be moved across the liner 12 to detect a spark discharge between the probe and the conductive layer 24. A source of potential 28 is connected to the layer 24 and the probe 26. A conventional detector/alarm indicates when a hole is detected. While the probe 26 may take a variety of forms, the probe 26 is illustrated as a brush with brass bristles 32. The bristles 32 are at a relatively high potential so that when they pass over a hole, a spark jumps between the layer 24 and the bristles. This spark can be detected by an operator or by conventional equipment.

In this way, the existence and location of the leak may be more reliably determined. Since it is no longer necessary to fill the reservoir to do the test, the need to empty the reservoir to fix the leaks is avoided. Since these reservoirs may be on the order of 50,000 square meters, this is an important advantage. Moreover, with this technique the primary liner of a dual liner system may be analysed. Since it is often desirable to use double liners in the more sensitive applications, the ability to effectively electrically test the primary liner is a very important advantage.

Figure 4:
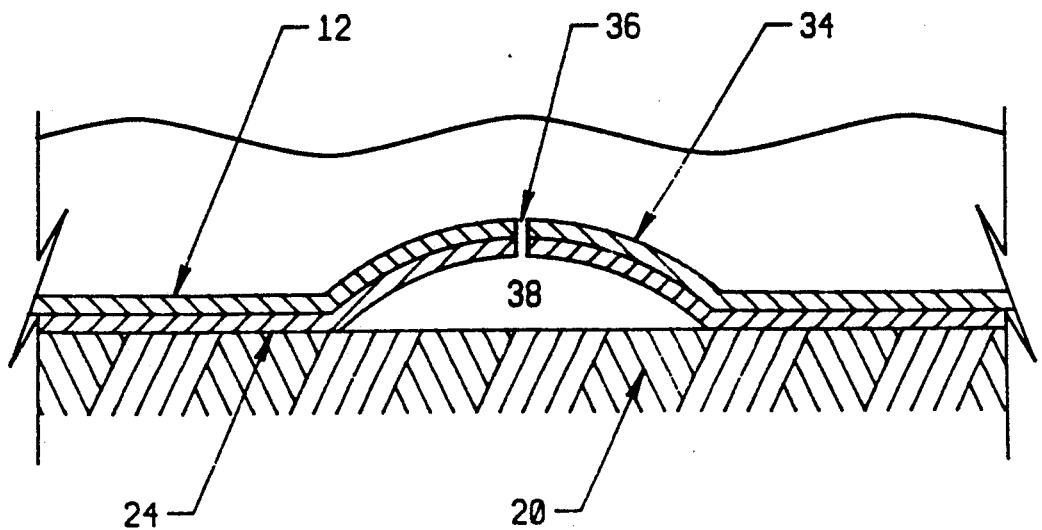
FIG. 4 is an enlarged cross-sectional view of a portion of the liner illustrating a wrinkle.

With the present invention, the presence of a wrinkle in liner 12 has no adverse effect as it generally does with the prior art. As shown in FIG. 4, the wrinkle 34 in liner 12 has a hole 36. With the present invention, the gap 38 between the liner 12 and the subgrade is of no consequence since the layer 24 provides the needed potential difference. With the prior art, the potential difference is diminished because the subgrade, which is effectively the other electrode, has been spaced from the liner 12.

Figure 5:
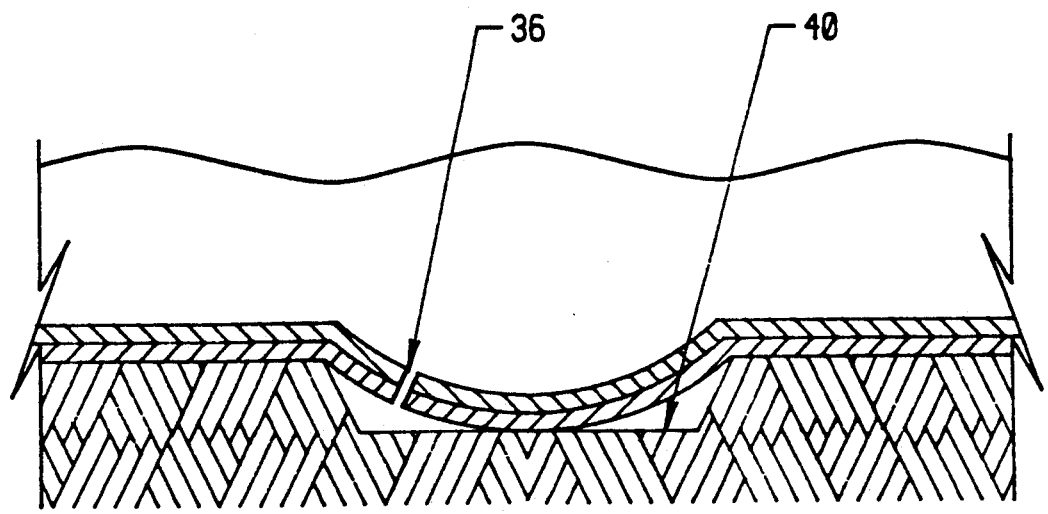
FIG. 5 is an enlarged cross-sectional view of a portion of a liner illustrating a depression in the subgrade.

Similarly, as shown in FIG. 5, the presence of a depression 40 in the subgrade 20 is of no consequence with the present invention. However, with prior art systems, the hole 36 may go undetected because the depression 40 effectively removes the second electrode (the subgrade 20) from the system.

The present invention is advantageously applied to a double liner system as illustrated in FIG. 6. As explained previously, double liners present a problem in testing using conventional techniques because it is not feasible to get the upper or the primary liner in close contact with the ground. In FIG. 6, the primary liner 52 sits over a secondary liner 54. The liners 52 and 54 may be made in the same fashion as the liner 12. However, in case of a leak in the primary liner 52, the liquid will be controlled by the secondary liner 54. In the illustrated embodiment, the primary 52 and secondary 54 each include an upper layer 22 and a lower conductive layer 24. The probe 26 may then be connected to a power supply 28 which in turn may be connected to the conductive layer of both the primary 52 and secondary 54. If desired, the secondary layer may dispense with the conductive layer 24. However, if it is necessary to repair the primary by cutting out a section, including the conductive layer 24 on the secondary sheet allows electrical testing of the secondary through the hole made in the primary. This makes it possible to check to see if any cuts were accidentally made in the secondary when cutting the primary.

The following example serves to illustrate one embodiment of the present invention. A 60 mil high density polyethylene base liner was co-extruded with a 6 mil high density polyethylene conductive layer which contained 15% by weight of Cabot Corp. Black Pearls 2000 furnace type carbon black. The carbon black was mixed into the plastic by using a screw type blender to obtain an A-1 dispersion. The carbon black has a nitrogen surface area of 1475 $m^2/g$. A 12,000 volt spark tester, made by Pipeline Inspection Co., model 725, was connected with the cathode attached to the lower conductive layer and the anode connected to a two foot wide brass brush. The liner was seamed to form one panel of double sheet width using both the extrusion and hot wedge welding systems. The liner was then placed on a non-conducting, high density polyethylene liner on a concrete surface to insulate the panel from any outside electrical sources. The entire surface of the panel was tested by dragging the brass brush over the surface. Thereafter, three holes approximately 0.1 millimeter in diameter were pierced through the upper layer and the conducting layer of the test panel and the panel was retested over the entire surface. All holes were detected as the brush passed over by a visible spark and audible alarm.

The liner may be formed of a number of large flexible sheets aligned in abutting, overlapping fashion. Adjacent sheets are connected at seams using conventional welding techniques, such as extrusion or wedge welding.

Figure 2:
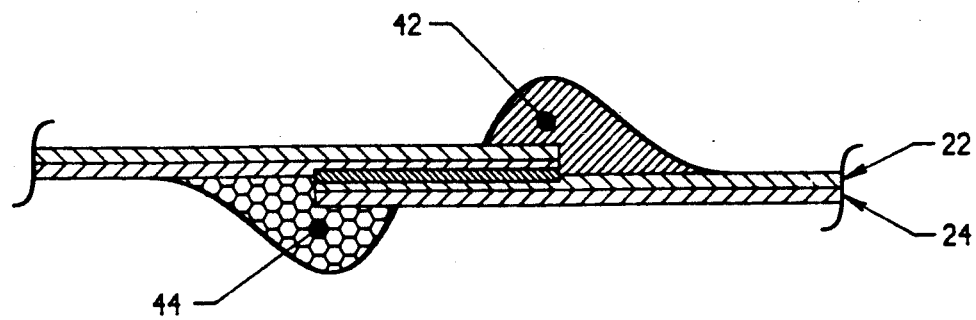
FIG. 2 is an enlarged end view of one embodiment of a seam between sheets forming the linear shown in FIG. 1.

Referring now to FIG. 2, one technique for seaming together adjacent layers in abutting fashion involves extrusion welding the layers in lapped abutment. A pair of extrusion welds 42 and 44 may be used to join the lapped liner 12. Since the conductive layers 24 are then spaced vertically apart, it may be desirable to electrically join the adjacent conductive layers. This may advantageously be accomplished by using a welding plastic for the weld 44 that has been rendered conductive in the fashion described previously for the layer 24.

Figure 3:
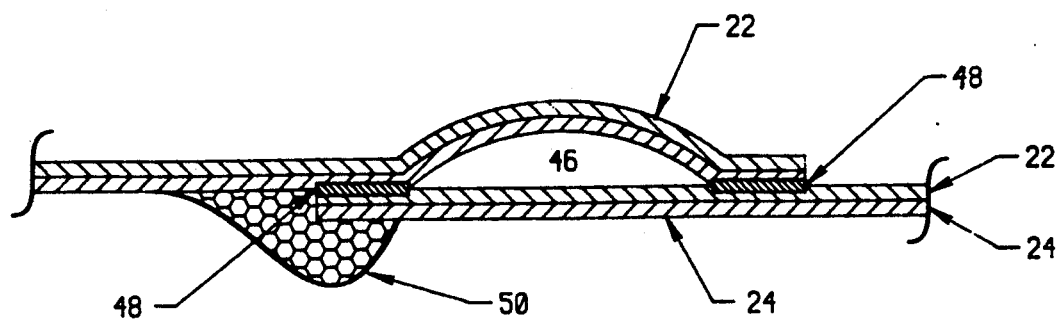
FIG. 3 is an enlarged end view of another embodiment of a seam for the liner shown in FIG. 1.

Referring to FIG. 3, a technique is illustrated for joining adjacent sheets in lapped abutment by way of a wedge welding technique known in the art. In this case, a cavity 46 may be formed between a pair of wedge welds 48. Electrical continuity can be assured by electrically connecting the layers. This may be done by providing an electrical bridge near the edge of the liner 12 between adjacent sheets. For example, conductive plastic may be deposited at 50 to provide the desired connection. The integrity of the welds 48 may be assured by pressure testing the cavity 46.

Thus, it is apparent that there has been provided, in accordance with the invention, a method and apparatus that fully satisfies the aims, objects and advantages set forth above. While the invention has been described in conjunction with specific embodiments thereof, it is evident that many alternatives, modifications, and variations will be apparent of those skilled in the art in light of the foregoing description. For example, while a polyethylene liner is disclosed, other plastics can be used including polyvinyl chloride polymers. Accordingly, it is intended to embrace all such alternatives, modifications, and variations as fall within the spirit and broad scope of the appended claims.

I claim:

1. A flexible thermoplastic sheet for forming a liner for an outdoor earthen fluid containment area, said thermoplastic sheet having an upper flexible plastic layer and a lower flexible plastic layer adapted to be positioned over said containment area, said lower plastic layer being adapted to sufficiently conduct electricity to enable detection of pin hole leaks in the liner by establishing a potential difference between a probe within the containment area and said lower plastic layer, said sheet being adapted to be maintained for flexure in use over said containment area so as to at least approximately conform to the shape of the containment area.

2. The thermoplastic sheet liner as in claim 1, wherein said sheet is constructed of uniform high density polyethylene.

3. The thermoplastic sheet as in claim 1, wherein said lower layer contains conductive particles embedded within it.

4. The thermoplastic sheet of claim 3, wherein said lower layer has a volume resistivity of less than 280 ohm-cm.

5. The thermoplastic sheet of claim 3 having a volume resistivity of between about 10 and about 60 ohm-cm.

6. The thermoplastic sheet of claim 3, wherein said conductive particles include carbon black.

7. The thermoplastic sheet of claim 6 wherein said particles are from about 10 to about 25% by weight of the lower plastic layer.

8. The thermoplastic sheet of claim 3, wherein said sheet is formed of two co-extruded layers of plastic material.

9. The thermoplastic sheet of claim 1, wherein said layers are of different densities.

10. The thermoplastic sheet of claim 9, wherein said lower plastic layer is less dense than said upper plastic layer.

11. The thermoplastic sheet of claim 1, wherein said sheet is constructed of at least two layers, said layers being integrally bonded to one another.

12. The thermoplastic sheet of claim 11 wherein said layers are co-extruded together.

13. The thermoplastic sheet of claim 1, wherein said lower plastic layer is less than 20% of the thickness of the liner.

14. The thermoplastic sheet of claim 13, wherein said lower plastic layer is between about 5 to 10% of the thickness of the liner.

15. The thermoplastic sheet of claim 1, wherein said lower plastic layer forms an outward surface of said liner.

16. The thermoplastic sheet of claim 1, wherein said lower plastic layer is formed from low density polyethylene plastic.

17. The thermoplastic sheet of claim 16, wherein said upper plastic layer is high density polyethylene.

18. The thermoplastic sheet of claim 1 including a second plastic liner to provide additional protection against leaks.

19. A method for waterproofing an area of soil comprising the steps of:
 (a) forming a flexible plastic sheet with a region capable of conducting sufficient electricity to enable pin hole leaks to be reliably located by establishing a potential difference between a probe within the containment area and said flexible plastic sheet;
 (b) covering the soil to be waterproofed with a plurality of said flexible sheets;
 (c) aligning said sheets in an abutting fashion to create a seam region between adjoining sheets; and
 (d) permanently joining said abutting sheets to provide a continuous and uninterrupted barrier of plastic facing the area from which liquid is to be barred.

20. The method of claim 19 including the step of creating a potential difference across said sheet.

21. The method of claim 20 including the step of causing a spark to be created where a hole exists in a sheet.

22. The method of claim 19, wherein said forming step includes the step of co-extruding a first plastic stream with a second plastic stream having conductive particles dispersed within it.

23. The method of claim 19, wherein the conductive regions of said sheets are electrically bridged to one another across the seam.

24. The method of claim 23, wherein said bridge is formed by depositing electrically conducting plastic.

25. A flexible thermoplastic liner for an outdoor earthen fluid containment area, said thermoplastic liner having an upper surface and a lower surface adapted to lie over said containment area, said liner having a flexible layer containing conductive particles, said layer being situated proximate to said lower surface, and being adapted to serve as a conductive region for the detection of liner holes by establishing a potential difference between a probe within the containment area and said layer containing conductive particles, said liner being adapted to be maintained for flexible in use over said containment area so as to at least approximately conform to the shape of the containment area.

26. The thermoplastic liner of claim 25, wherein said conductive particles have a surface area greater than 1000 $m^2/cm$.

27. The thermoplastic liner of claim 26, wherein said conductive particles include furnace type carbon black.

28. The thermoplastic liner of claim 26, wherein said conductive particles have a surface area of about 1475 $m^2/cm$.

29. A thermoplastic liner for an outdoor earthen fluid containment area, said thermoplastic liner having an upper surface and a lower surface adapted to lie on said fluid containment area, said liner having a conductive region encapsulated within said liner, said conductive region having a volume resistivity of less than 280 ohm-cm, said liner being flexible, such that said conductive region is adapted to sufficiently conduct electricity to enable detection of pin hole leaks in the liner by establishing a potential difference between a probe within the containment area and said conductive region, said liner being adapted and maintained for flexure in use over said containment area so as to at least approximately conform to the shape of the containment area.

30. The thermoplastic liner of claim 29, wherein said conductive region forms an outward facing surface of said liner.

31. The thermoplastic liner of claim 29, wherein said conductive region makes up less than 20% of the liner thickness.

32. The thermoplastic liner of claim 29, wherein said conductive region is formed of conductive particles embedded within plastic.

33. The thermoplastic liner of claim 32, wherein said particles are chemically inert.

34. The thermoplastic liner of claim 29, wherein said conductive region has a volume resistivity of between about 10 and about 60 ohm-cm.

35. A flexible thermoplastic liner for an outdoor earthern fluid containment area comprising at least two plastic layers, one of said layers being more conductive than the other of said layers, said more conductive layer being formed of plastic that is less dense than the plastic forming the less conductive layer, said more conductive layer being adapted to sufficiently conduct electricity to enable detection of pin hole leaks in the liner by establishing a potential difference between a probe within the containment area and said more conductive layer, said sheet being adapted to be maintained for flexure in use over said containment area so as to at least approximately conform to the shape of the containment area.

36. The thermoplastic liner of claim 35, wherein said more conductive layer is formed from low density polyethylene.

37. The thermoplastic liner of claim 36, wherein said less conductive layer is high density polyethylene.

38. The thermoplastic liner of claim 37, wherein the more conductive layer has a volume resistivity of less than 280 ohm-cm.

* * * * *